United States Patent [19]

Craig

[11] Patent Number: 4,558,259

[45] Date of Patent: Dec. 10, 1985

[54] CONTROLLER FOR A MOVABLE MOTOR VEHICLE HEADLAMP MECHANISM

[75] Inventor: Gale M. Craig, Anderson, Ind.

[73] Assignee: General Motors Corporation, Detroit, Mich.

[21] Appl. No.: 569,221

[22] Filed: Jan. 9, 1984

[51] Int. Cl.$^4$ ............................................. B60Q 1/02
[52] U.S. Cl. ...................................... 315/82; 362/65;
307/10 LS; 318/256; 318/264; 318/282;
318/459; 318/468
[58] Field of Search ............... 362/65, 66; 307/10 LS;
315/82, 83; 318/255, 256, 257, 258, 280, 282,
459, 468, 264, 265, 266, 145, 331, 368

[56] References Cited

U.S. PATENT DOCUMENTS

| | | | |
|---|---|---|---|
| 3,601,594 | 8/1971 | Carbary | 317/33 |
| 3,617,835 | 11/1971 | Dreher | 318/285 |
| 3,728,604 | 4/1973 | Grygera | 318/459 |
| 4,001,661 | 1/1977 | Terabayashi | 318/264 |
| 4,282,561 | 8/1981 | Yano | 362/65 |
| 4,461,975 | 7/1984 | Osaki et al. | 307/10 LS |
| 4,486,818 | 12/1984 | Hashimoto et al. | 307/10 LS |
| 4,514,670 | 4/1985 | Fassel et al. | 318/266 |

*Primary Examiner*—Saxfield Chatmon
*Attorney, Agent, or Firm*—Mark A. Navarre

[57] ABSTRACT

A control unit for operating the motor of a motor driven headlamp carrier mechanism includes oscillator circuitry for generating a series of pulses for energizing the motor, voltage responsive means for sensing a motor counter-EMF related voltage as an indication of motor rotation, output circuitry for interrupting motor energization when the voltage responsive circuitry senses motor stall, and start circuitry for energizing the motor independent of the oscillator circuitry for a period of time sufficient to produce motor counter-EMF. Such control permits sensing of the engagement of the headlamp carrier with fixed mechanical stops without the use of position or torque limit switches.

10 Claims, 2 Drawing Figures

CONTROLLER FOR A MOVABLE MOTOR VEHICLE HEADLAMP MECHANISM

This invention relates to concealed motor vehicle lighting systems and more particularly to a controller for operating a motor-driven headlamp carrier.

Systems of the above type generally include an electric motor connected to a movable headlamp carrier through a suitable linkage mechanism and a controller for energizing the motor to raise or lower the headlamp carrier in response to actuation of the headlamp switch by the operator of the vehicle. When the headlamp switch is shifted to the ON position, the motor is energized in a direction to move the headlamp carrier to an upper limit position fully exposing the headlamp. When the headlamp switch is shifted to the OFF position, the motor is energized in the opposite direction to move the headlamp carrier to a lower limit position fully concealing the headlamp.

Systems of the above type, must also include means for stopping the headlamp carrier and interrupting motor energization when the headlamp carrier reaches the upper or lower limit position. Two different arrangements have been used in the prior art: position sensing and torque sensing.

In the position sensing arrangement, limit switches are located relative to the upper and lower limit positions of the headlamp carrier and operate to interrupt motor energization when the headlamp carrier reaches the limit position. When motor energization is interrupted, the headlamp carrier stops and remains stationary until the motor is re-energized to move the carrier to the other limit position. While such arrangement is relatively simple, it fails to accurately position the headlamp carrier due to coasting of the carrier and motor after motor energization is interrupted.

In the torque limiting arrangement, mechanical stops are located to engage the headlamp carrier or its linkage when the carrier reaches the upper or lower limit positions to thereby ensure proper positioning of the headlamp. A torque limit switch interrupts motor energization when the motor output torque exceeds a reference amount. As a result, the motor energization is interrupted after the headlamp carrier has been moved into engagement with the respective stop. A detailed description of such a system is given in the 1982 Pontiac Firebird Service Manual.

The present invention provides an improved method and apparatus for controlling the operation of a motor driven headlamp carrier wherein the motor is energized to move the carrier into engagement with fixed mechanical stops which define the limit positions of its travel and wherein engagement of the carrier with the stop is sensed without the use of a limit switch mechanism. According to the present invention, an electronic controller senses a motor counter-EMF related voltage as an indication of motor rotation and generates a stall signal when the motor counter-EMF falls substantially to zero indicating that the headlamp carrier has moved into engagement with a mechanical stop. An oscillator mechanism in the controller develops a series of pulses for energizing the motor and such pulses are interrupted to interrupt motor energization in response to the generation of a stall signal. To initiate motor operation, a start mechanism in the controller energizes the motor independent of the oscillator mechanism for a period of time sufficient in duration to produce motor energization for increasing the motor counter-EMF substantially above zero, whereafter motor energization is controlled by the oscillator mechanism and the counter-EMF sensing mechanism as described above. Due to the nature of the above control, the motor output torque is only limited under conditions of motor stall. In systems incorporating torque limit switches on the other hand, the torque reference must be set in relation to the lowest expected system operating voltage so as to ensure interruption of motor energization when the battery voltage, and hence the available motor torque, is relatively low. As a result, the control system of this invention permits the use of a smaller, lighter electric motor than would otherwise be possible.

Motor operation is initiated in response to the operator's shifting of the headlamp switch, and the motor is de-energized independent of the counter-EMF sensing mechanism a predetermined time thereafter. The predetermined time is longer than that required for full movement of the carrier, and thus prevents continued free-running of the motor in the event that the motor becomes disconnected from the headlamp carrier.

This invention further provides a failsafe mode of operation if the motor energization is contrary to that indicated by the position of the headlamp switch. If, while the headlamp switch is not in the OFF position, the motor is energized in a direction to lower the headlamp, the motor energization is interrupted to prevent movement of the headlamp carrier. Normal operation resumes when the headlamp switch is shifted to the OFF position.

IN THE DRAWINGS

Figure 1:
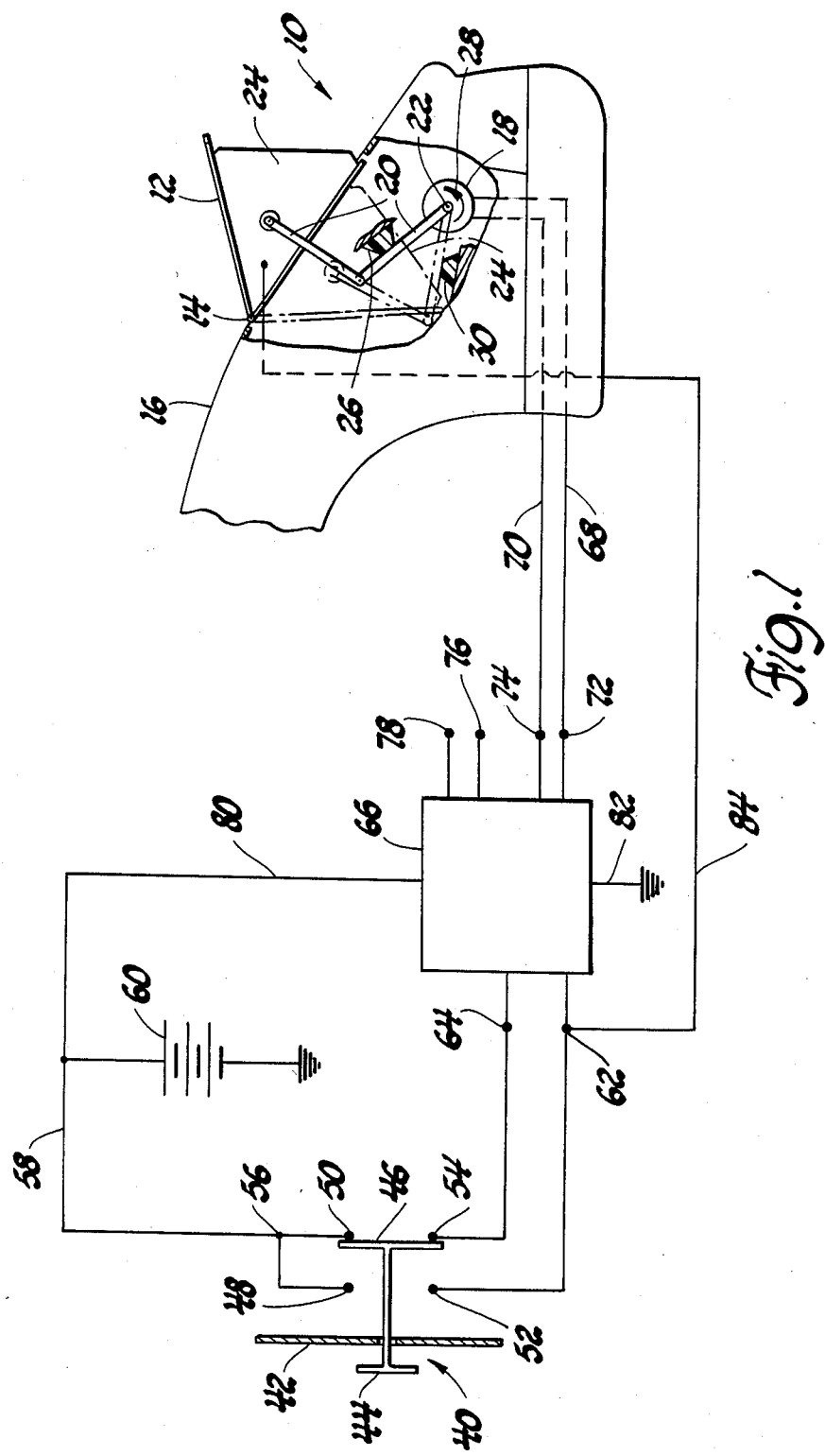
FIG. 1 is a schematic diagram depicting a headlamp mechanism and the control unit of this invention.

Referring now more particularly to FIG. 1, reference numeral 10 generally designates the righthand headlamp assembly of a motor vehicle. The lefthand headlamp assembly (not shown) is provided on the opposite side of the vehicle in the customary manner. The headlamp assemblies are substantially identical and it will be understood that the following description of the righthand headlamp assembly 10 equally applies to the lefthand headlamp assembly. The headlamp assembly 10 comprises a movable carrier 12 pivotally mounted about pin 14 on body panel 16, an electric motor 18, and a linkage mechanism 20 connecting the motor output shaft 22 to the carrier 12. A headlamp 24 is mounted in carrier 12, and motor 18 is effective when driven in the clockwise direction to move the linkage mechanism 20 into engagement with a mechanical stop 26 to fully expose the headlamp as shown in solid lines in FIG. 1. When motor 18 is driven in the counterclockwise direction as indicated by arrow 28, the linkage mechanism 20 is moved into engagement with mechanical stop 30 to fully conceal the headlamp 24, as shown in phantom in FIG. 1.

A headlamp switch, generally designated by the reference numeral 40, is mounted on the vehicle instrument panel 42 and is adapted to be manipulated by the operator of the motor vehicle for selectively energizing or de-energizing headlamp 24. The headlamp switch 40 includes a stem 44 and integral contact bar 46, a pair of input contacts 48 and 50, and a pair of output contacts 52 and 54. The input contacts 48 and 50 are electrically joined at terminal 56 which is connected via line 58 to the positive terminal of the vehicle storage battery 60. The negative terminal of storage battery 60 is connected to ground potential. Thus, when headlamp switch 40 is in the OFF position, as shown in FIG. 1, output contact 52 is open-circuited and output contact 54 is connected through contact bar 46 to the positive terminal of battery 60. When the operator pulls on the headlamp switch stem 44 to light the vehicle headlamp 24, the contact bar 46 moves out of engagement with input contact 50 and output contact 54 and into engagement with input contact 48 and output contact 52. In such position, output contact 54 is open-circuited and output contact 52 is connected to the positive terminal of battery 60 through contact bar 46. The output contacts 52 and 54 of headlamp switch 40 are connected to the input terminals 62 and 64 of control unit 66, and control unit 66 is responsive to the voltages at its input terminals 62 and 64 for controlling energization of motor 18 to raise and lower headlamp carrier 12. To this end, lines 68 and 70 connect control unit output terminals 72 and 74 to the input terminals of motor 18. The control unit output terminals 76 and 78 are adapted to be connected by a similar means to the second motor vehicle headlamp assembly (not shown). Power for control unit 66 is obtained from the vehicle battery 60 via line 80 which connects control unit 66 to the positive terminal of battery 60 and via line 82 which connects control unit 66 to ground potential. The control unit input terminal 62 is connected to a terminal of headlamp 24 via line 84 for energizing the headlamp 24 whenever the headlamp switch 40 is in the ON position. The other terminal of headlamp 24 is connected via suitable means (not shown) to ground potential at the vehicle body panel 16.

Figure 2:
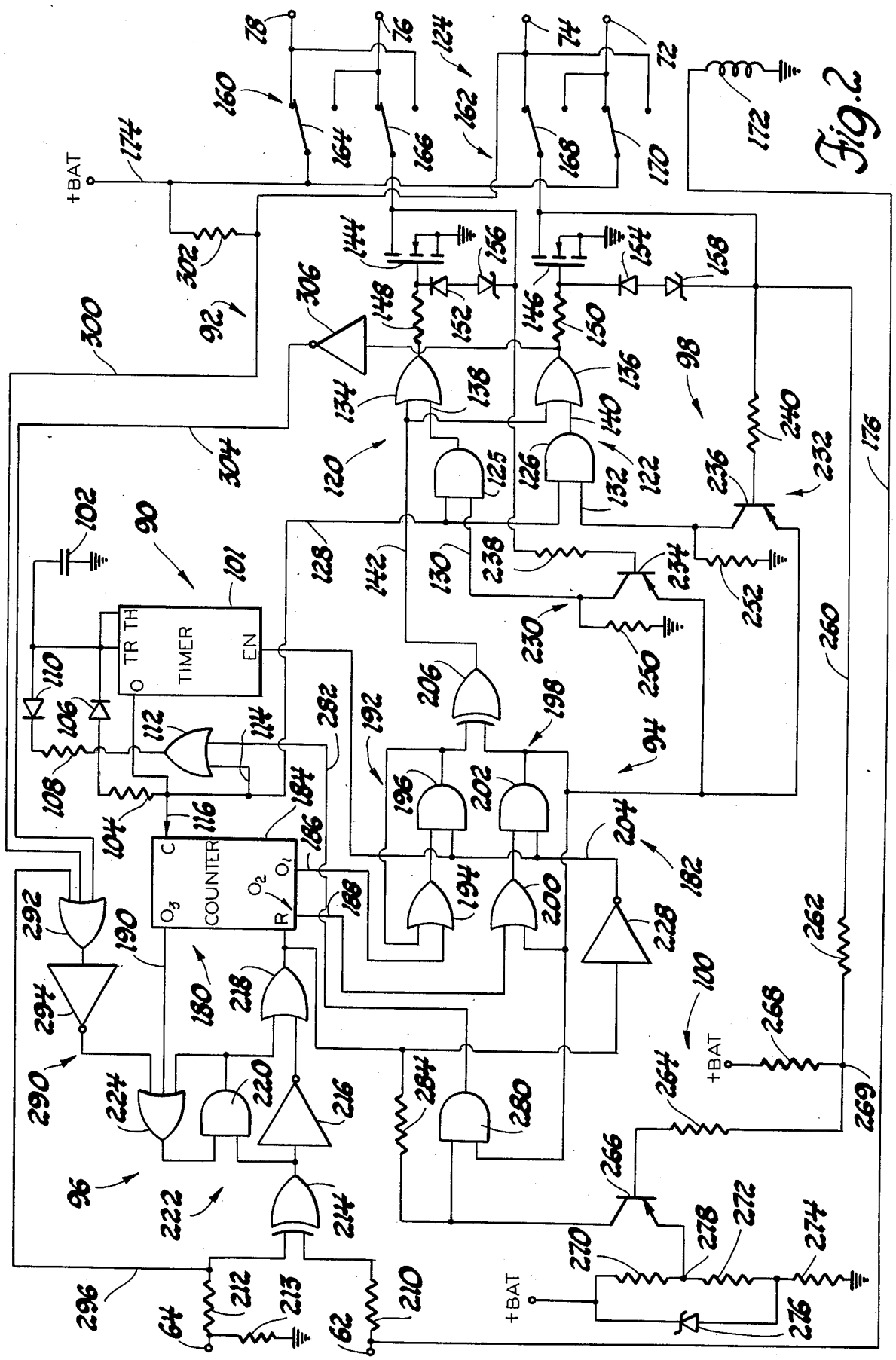
FIG. 2 is a circuit diagram of the control unit depicted in FIG. 1.

FIG. 2 is a circuit diagram of the control unit shown in FIG. 1, including the control unit input terminals 62 and 64, the control unit output terminals 72-78 and the control unit power and ground connections. For ease of description, the control unit 66 is functionally divided into six subcircuits: an oscillator circuit 90, an output circuit 92, a start circuit 94, an input and reset circuit 96, a stall sensing circuit 98, and a speed sensing circuit 100. The oscillator circuit 90 is effective when enabled to develop a series of output pulses for controlling the energization of motor 18. The output circuit 92 is responsive to the output pulses produced by the oscillator circuit 90 for energizing the motor 18 in accordance therewith. The start circuit 94 operates each time the motor 18 is started to produce a starting pulse for energizing motor 18 through output circuit 92. The input and reset circuit 96 is responsive to the operator's manipulation of the headlamp switch 40 and acts to suitably operate the oscillator circuit 90 and the start circuit 94. The stall sensing circuit 98 is responsive to a motor counter-EMF related voltage and operates to interrupt motor energization when the headlamp carrier 12 has been moved against a mechanical stop 26 or 30. The speed sensing circuit 100 is also responsive to a motor counter-EMF related voltage and operates to interrupt motor energization if the rotational velocity of motor 18 exceeds a reference value.

The oscillator circuit 90 is implemented with an integrated circuit timer 101, such as the ICM 7555 timer manufactured by Intersil, Inc., Cupertino, Calif. In the illustrated embodiment, the timer 101 is connected to operate as an oscillator, alternately charging and discharging the capacitor 102. The charging circuit for capacitor 102 comprises a serially connected resistor 104 and diode 106 connected between capacitor 102 and the output (O) of timer 101, and the discharge circuit comprises a serially connected resistor 108 and diode 110 connected between the capacitor 102 and the output of OR gate 112. One input of OR gate 112 is connected via line 114 to the output (O) terminal of timer 101 so that its operation is controlled thereby. When the output (O) terminal of timer 101 switches from its low state to its high state, capacitor 102 is charged through resistor 104 and diode 106 until the voltage thereacross exceeds a predetermined threshold set internal to timer 101. At such time, the output (O) of timer 101, and hence the output of OR gate 112, changes from its high state to its low state, and capacitor 102 is discharged through diode 110 and resistor 108. When the voltage across capacitor 102 falls below a second threshold voltage developed internal to timer 101, the output (O) of timer 101 switches back to its high output state and capacitor 102 is recharged as described above. In this way, the oscillator circuit 90 provides a series of output pulses on line 116, the frequency of such pulses being determined by the combined charge and discharge time constants of resistors 104 and 108 and capacitor 102.

The operation described above is subject to the voltage at the enable (EN) input of timer 101. If the enable input is held at a logic 1 voltage potential, the oscillator circuit 90 produces a series of output pulses as described; if the enable input is held a logic 0 voltage potential, timer 101 is reset and the voltage on line 116 is maintained at a logic 0 voltage potential. As will later be explained, the voltage applied to the enable input of timer 101 is controlled by the input and reset circuit 96. As will also later be explained, a second input of OR gate 112 is connected to the speed sensing circuit 100 so that capacitor 102 cannot discharge if a condition of motor overspeed is detected.

The output circuit 92 is comprised of a left motor drive circuit 120, a right motor drive circuit 122, and a motor reversing relay 124. The left and right motor drive circuits 120 and 122 each comprise an AND gate 125, 126 connected to receive input signals from oscillator circuit 90 via line 128 and from stall sensing circuitry 98 via lines 130 and 132, and an OR gate 134, 136 for receiving input signals from the respective AND gates 125, 126 via lines 138 and 140 and from the start circuit 94 via line 142. The left and right motor drive circuits 120 and 122 also each include a power transistor 144, 146 and associated input resistor 148, 150 connected between the respective OR gate 134, 136 and the motor reversing relay 124. The power transistors 144, 146 control the energization of the headlamp control motors (such as motor 18), and the conduction of the power transistors 144, 146 is controlled by the output state of the associated OR gate 134, 136. The left and right motor drive circuits 120 and 122 are normally operated together in response to either the output of oscillator circuit 90 or start circuit 94, but may be individually disabled by the stall sensing circuitry 98 which operates to hold lines 130 and/or 132 at a logic 0 voltage potential if a condition of motor stall is detected. To protect the power transistors 144 and 146 from inductive switching transients, the left and right motor drive circuits 120 and 122 each include a protective circuit comprising a serially connected diode 152, 154 and zener diode 156, 158 connected across the gate - source circuit of the respective power transistor 144, 146. When inductive transients occur, the zener diodes 156 and 158 conduct to maintain the power transistors 144 and 146 in conduction.

The motor reversing relay 124, comprises left and right double-pole-double-throw switch mechanisms 160 and 162. The left and right switch mechanisms 160 and 162 each comprises a pair of switch arms 164 and 166, 168 and 170, which are selectively switchable to one of two positions in accordance with the energization of electrical winding 172. A spring or other resilient mechanism (not shown), normally maintains the switch arms 164–170 in the position shown in FIG. 2, and energization of electrical coil 172 produces an attractive force sufficient to overcome the resilient mechanism and to move the switch arms 164–170 downward into engagement with alternate contacts The power transistors 144 and 146 are connected to the switch arms 166 and 168, respectively, and the vehicle battery 60 is connected via line 174 to the switch arms 164 and 170. Respecting the motor 18, the motor reversing relay 124 operates when in the position depicted in FIG. 2 to connect the battery 60 to output terminal 72 and the drain of power transistor 146 to output terminal 74. Similarly, the battery 60 is connected to output terminal 78, and the drain of power transistor 144 is connected to output terminal 76. In such state, motor current controlled through power transistor 146 produces counterclockwise rotation of motor 18 to lower headlamp carrier 12 to the fully concealed position.

When electrical coil 172 is energized, switch arms 164–170 are switched to their alternate state as noted above. Respecting the motor 18, the vehicle battery 60 is connected to output terminal 74 and the drain of power transistor 146 is connected to output terminal 72. Similarly, battery 60 is connected to output terminal 76 and the drain of power transistor 144 is connected to output terminal 78. In such state, motor current controlled through power transistor 146 produces clockwise rotation of motor 18 to raise the headlamp carrier 12 to the fully exposed position. The electrical coil 172 is connected via line 176 to the control unit input terminal 62 so that electrical coil 172 is energized whenever and so long as the headlamp switch 40 is in the ON position, lighting the headlamp 24.

The start circuit 94 is comprised of a counter circuit 180 and a latch circuit 182. In the illustrated embodiment, the counter circuit 180 is implemented with an integrated circuit counter such as the CD 4060 twelve-stage ripple-carry binary counter manufactured by National Semiconductor Corporation, Santa Clara, Calif. The output of oscillator circuit 90 is connected to the clock (C) input of counter 184 via line 116, and counter 184 produces output pulses on lines 186, 188 and 190 after predetermined numbers of oscillator pulses have been counted. According to the illustrated embodiment, a pulse is produced on line 186 after 8 oscillator pulses have been counted, on line 188 after 16 oscillator pulses have been counted, and on line 190 after 256 oscillator pulses have been counted. When the reset input (R) of counter 184 is raised to a logic 1 voltage potential, the output lines 186, 188 and 190 are reset to zero.

The latch circuit 182 of start circuit 94 is responsive to the output lines 186 and 188 of counter 184 and operates to generate a start pulse on line 142 for energizing motor 18 at the initiation of motor operation. More particularly, the latch circuit 182 includes a start latch 192 comprising an OR gate 194 and AND gate 196, and a stop latch 198 comprising an OR gate 200 and an AND gate 202. One input of OR gate 194 is connected to the counter output line 186 and one input of the OR gate 200 is connected to the counter output line 188. To provide the latch operation, the output of AND gate 196 is connected as an input to OR gate 194, and the output of AND gate 202 is connected as an input to the OR gate 200. The output of OR gate 194 provides an input to AND gate 196, and the output of OR gate 200 provides an input to AND gate 202. A separate input to AND gates 196 and 202 is provided by the input and reset circuit 96 through OR gate 218 and inverter 228 on line 204. If line 204 is maintained at a logic 1 voltage potential, the output AND gate 196 latches at a logic 1 voltage potential in response to an output pulse on counter output line 186, and the output of AND gate 202 latches at a logic 1 voltage potential in response to an output pulse on counter output line 188. The outputs of AND gates 196 and 202 are applied as inputs to exclusive OR gate 206, the output of which is connected to line 142 for controlling the conduction of power transistors 144 and 146.

The input and reset circuit 96 is responsive to the voltage at control unit input terminals 62 and 64 and operates to suitably control the oscillator circuit 90 and start circuit 94 for providing the desired movement of headlamp carrier 12. The control unit input terminals 62 and 64 are connected through input resistors 210 and 212 as inputs to exclusive OR gate 214. The output of exclusive OR gate 214 is applied through inverter 216 and OR gate 218 to the reset input (R) of counter 184 and also as an input to AND gate 220 of a reset latch circuit, designated generally by the reference numeral 222. The reset latch circuit 222 also includes an OR gate 224 cross coupled with AND gate 220. Output line 190 of counter 184 is applied as a further input to OR gate 224. The output of OR gate 218 is connected through inverter 228 to line 204.

The control unit input terminals 62 and 64 are normally maintained near ground potential by the electrical coil 172 and the resistor 214. When the headlamp switch 40 is in the ON position or the OFF position, the output of exclusive OR gate 214 is maintained at a logic 1 voltage potential. However, when the headlamp switch 40 is shifted from one position to the other, the output of exclusive OR gate 214 momentarily falls to a logic zero voltage potential thereby driving the output of OR gate 218 to a logic 1 voltage potential and the output of AND gate 220 to a logic 0 voltage potential. As a result, the counter 184 is reset and the output of AND gate 220 is maintained at a logic 0 voltage potential. In addition, line 204 is driven to a logic 0 voltage potential disabling the start circuit 94 and oscillator circuit 90. When the headlamp switch 40 reaches its new position, the output of exclusive OR gate 214 is returned to a logic 1 voltage potential, thereby driving the output of OR gate 218 to a logic 0 voltage potential and one input of AND gate 220 to a logic 1 voltage potential, thus enabling reset latch 222. The OR gate 224 maintains the other input of AND gate 220 at a logic 0 voltage potential and line 204 is returned to its normal logic 1 voltage potential, enabling start circuit 94 and oscillator circuit 90. After counter 184 has counted 256 oscillator clock pulses, the counter output line 190 is raised to a logic 1 voltage potential, and the output of AND gate 220 is thereby latched at a logic 1 voltage potential. As a result, the output of OR gate 218 is raised to a logic 1 voltage potential, resetting counter 184 and disabling start circuit 94 and oscillator circuit 90. Such state is referred to as the quiescent state and is maintained until the headlamp switch 40 is shifted to a new position.

The stall sensing circuit 98 is comprised of left and right sensing circuits 230 and 232; each is responsive to a motor counter-EMF related voltage for detecting a condition of motor stall. The right sensing circuit 232 is responsive to the counter-EMF related voltage for motor 18 and the left sensing circuit 230 is responsive to counter-EMF related voltage for the headlamp operating motor not shown in FIG. 1. Each of the circuits 230 and 232 includes a transistor 234, 236 connected to compare the voltage at the drain terminal of the respective power transistor 144, 146 to battery voltage. The drain terminal of power transistor terminal 144 is connected through resistor 238 to the base input of transistor 234 and the drain terminal of power transistor 146 is connected through resistor 240 to the base input of transistor 236. The emitter inputs of both transistors 234 and 236 are connected to the output of AND gate 202 of start circuit 94, so that the stall sensing circuit is only effective to compare the voltages after the start circuit 94 has produced a start pulse to initiate motor starting. The collector of transistor 234 is connected as an input of AND gate 124 of left motor drive circuit 120 and the collector of transistor 236 is connected as an input of AND gate 126 of right motor drive circuit 122. Resistor 250 normally maintains such input of AND gate 124 at ground potential and resistor 252 normally maintains such input of AND gate 126 at ground potential. While the headlamp carrier motors are moving, transistors 234 and 236 are biased conductive, thereby allowing AND gates 124 and 126 to pass the oscillator output signals applied thereto via line 128. However, when the linkage mechanism 20 of the headlamp movement mechanism 10 engages a stop 26 or 30, the motor 18 stalls and the motor counter-EMF falls substantially to zero. As soon as the respective power transistor 144, 146 is biased to its nonconductive state, the voltage at the drain thereof rises substantially to battery voltage. At such point, transistors 234 and/or 236 become nonconductive and AND gates 124 and/or 126 operate to interrupt further oscillator output pulses on line 128, thereby interrupting further motor energization.

The speed sensing circuit 100 is responsive to the voltage at the drain terminal of power transistor 146, such voltage being connected via line 260 and resistors 262 and 264 to the base terminal of transistor 266. The positive terminal of battery 60 is connected through resistor 268 to a junction 269 between resistors 262 and 264 to scale the sensed voltage. A further voltage divider comprising the serially connected resistors 270, 272 and 274 and the zener diode 276 is connected between the positive terminal of battery 60 and ground potential for the purpose of developing a reference voltage against which the sensed voltage is compared. The reference voltage is taken off a junction 278 between resistors 270 and 272 and corresponds to a motor speed that should not be exceeded. The collector of transistor 266 is connected as an input to AND gate 280 and via resistor 284 to the output of OR gate 218. The other input to AND gate 280 is obtained from the output of AND gate 202 of start circuit 94. The output of AND gate 280 is connected via line 282 as an input to OR gate 112 of oscillator circuit 90.

When the speed of motor 18 is less than the reference speed and transistor 146 is nonconductive, transistor 266 is maintained nonconductive and resistor 284 holds the collector of transistor 266 at a logic zero voltage potential. As a result, the output of AND gate 280 is also maintained at a logic zero potential and the discharge of capacitor 102 is not interrupted. However, when the motor speed rises above the reference speed, the motor counter-EMF maintains the voltage at the drain of power transistor 146 sufficiently low that transistor 266 is biased into conduction, raising the voltage at its collector to a logic 1 voltage potential. If the output of AND gate 202 is at a logic 1 voltage potential, (that is, the motor start pulse is completed), the output of AND gate 280 also assumes a logic 1 voltage potential thereby maintaining the output of OR gate 112 of oscillator circuit 90 at a logic 1 voltage potential to interrupt the operation of oscillator circuit 90 by preventing discharging of capacitor 102. When the motor speed subsequently falls below the reference speed, transistor 266 returns to its nonconductive state and the output of OR gate 112 is once again governed by the logic level at the output (O) of timer 101. At such time, oscillator circuit 90 resumes developing output pulses on line 128 for output circuit 92.

A failsafe circuit, designated by the reference numeral 290, monitors the motor drive condition and the state of headlamp switch 40, and operates to reset the latch 222 of input and reset circuit 96 if motor 18 is energized in a direction to lower headlamp 24 while the headlamp switch 40 is not in the OFF position. The failsafe circuit 290 comprises a three-input OR gate 292, the output of which is applied through inverter 294 as an input to OR gate 224 of latch 222. The first input to OR gate 292 is responsive to the position of headlamp switch 40 and is connected to the control unit input terminal 64 via line 296 and resistor 212. When headlamp switch 40 is in the OFF position, such input is at a logic 1 voltage potential, and when the headlamp switch 40 is in the ON position, such input is at a logic zero voltage potential. A second input to OR gate 292 is responsive to the drive condition of motor 18 and is connected to the control unit output terminal 74 via line 300. A pull-up resistor 302 connects the line 300 to the positive terminal of battery 60. When motor reversing relay 124 is in the position shown in FIG. 1, and power transistor 146 is biased to its conductive state, the motor 18 is driven in a direction to lower the headlamp carrier 12. Under such conditions, the second input to OR gate 292 is driven from its normal logic 1 voltage potential to a logic 0 voltage potential. Thus, the second input to OR gate 292 is at a logic 1 voltage potential at all times except when motor 18 is driven in a direction to lower headlamp carrier 12. The third input to OR gate 292 senses the output condition of right motor drive circuit 122 and is connected to the output of OR gate 136 via line 304 and inverter 306. When the output of OR gate 136 is driven to a logic 1 voltage potential to drive power transistor 146 to its conductive state, such input is at a logic zero voltage potential. Otherwise, such input is at a logic 1 voltage potential. If the headlamp switch 40 is not in the OFF position and OR gate 136 is driven to a logic 1 voltage potential to bias power transistor 146 to its conductive state, the output of OR gate 292 falls to a logic 0 voltage potential. At such time, the output of inverter 294 rises to a logic 1 voltage potential and thereby sets the latch 222 of input and reset circuit 96. As a result, the outputs of AND gate 220 and OR gate 218 rise to a logic 1 voltage potential, thereby resetting counter 184 and disabling timer 101. Thus, the failsafe circuit 290 prevents the control unit 66 from energizing electric motor 18 in a direction to lower the headlamp carrier 12 unless the headlamp switch 40 is in the OFF position.

The operation of the controller of this invention will now be described in reference to FIGS. 1 and 2. In the quiescent or rest condition, the headlamp switch 40 is in the OFF position, maintaining control unit input terminal 64 at a logic 1 voltage potential and open circuiting control unit input terminal 62 to de-energize headlamps 24. In control unit 66, exclusive OR gate 214 is maintained at a logic 1 voltage potential and the latch circuit 222 of input reset circuit 96 is maintained in the set condition. As a result, the output of OR gate 218 is maintained at a logic 1 voltage potential resetting counter 184 and disabling start circuit 94 and timer 101. Electrical coil 172 of motor reversing relay 124 is de-energized and the relay contact arms 164–170 are maintained in the position shown in FIG. 1.

When the operator of the vehicle shifts the headlamp switch 40 to the ON position to light the motor vehicle headlamps 24, the control unit input terminal 64 is open-circuited and the input terminal 62 is connected to the positive terminal of battery 60 to energize the headlamp 24 via line 84. At the same time, the electrical coil 172 of motor reversing relay 124 is energized to shift the switch arms 164–170 to the position opposite to that shown in FIG. 2. In addition, the output of exclusive OR gate 214 is momentarily lowered to a logic zero voltage potential to thereby momentarily reset counter 184. At the termination of such reset, timer 101 begins producing output pulses on line 116 and counter 184 counts such pulses. When 8 such pulses have been counted, counter 184 produces an output pulse on line 186 which sets the start latch 192 of start circuit 198. As a result, line 142 rises to a logic 1 voltage potential to bias power transistors 144 and 146 into conduction through OR gates 134 and 136 to energize the headlamp motors 18. Due to the energization of relay electrical coil 172, such motor energization produces motor rotation in a direction to raise the headlamp carriers 12. After 16 timer output pulses have been counted by counter 184, an output pulse is produced on line 188 which sets the stop latch 198 of start circuit 94. At such time, the output of exclusive OR gate 206 falls to a logic zero voltage potential and power transistors 144 and 146 are biased to their nonconductive states to de-energize motors 18. According to the preferred embodiment, timer 101 produces output pulses on line 116 at a rate of approximately 60 Hz. As such, the output pulse on line 186 of counter 184 occurs approximately 170 milliseconds after the momemtary reset occasioned by the shifting of headlamp switch 40 to the ON position. In this way, counter 184 interposes a delay between the shifting of headlamp switch 40 to the ON position and the energization of headlamp motor 18, which delay is sufficient in duration to permit the electrical coil 172 of motor reversing relay 124 to shift the relay contact arms 164–170 to the position opposite to that shown in FIG. 2. Similarly, counter 184 interposes a delay of approximately 170 milliseconds between the generation of an output pulse on line 186 and the generation of the output pulse on line 188. As a result, start circuit 94 is effective to energize motors 18 through OR gates 134 and 136 for a period of approximately 170 milliseconds, a period sufficient in duration to produce motor rotation for increasing the motor counter-EMF substantially above zero. Thus, the transistors 234 and 236 of left and right stall sensing circuits 230 and 232 remain conductive upon termination of the motor start pulse, and further motor energization is controlled in accordance with the output pulses of timer 101 on line 128. Such output pulses bias power transistors 144 and 146 conductive and non-conductive in unison through AND gates 124 and 126, OR gates 134 and 136, and resistors 148 and 150. During such operation, the speed of motors 18 is normally less than the reference speed defined by the voltage divider of speed sensing circuit 100 so that transistor 266 thereof becomes nonconductive when the motor 18 is not energized. If, while the headlamp carriers 12 are being raised, the rotational velocity of motor 18 generates a motor counter-EMF which causes the sensed voltage on line 260 to exceed the reference, the transistor 266 remains conductive, and the output of AND gate 280 is maintained at a logic 1 voltage potential to prevent discharging of capacitor 102 of oscillator circuit 90. Such action interrupts energization of motor 18 and further energization is not permitted until the motor rotational velocity falls below the speed reference. Such an overspeed condition could be caused, for example, by an unusually high system operating voltage.

In a mechanization of the present invention, raising of the motor vehicle headlamp 24 takes approximately 0.6 seconds. When the headlamp is raised to the proper position, the linkage member 20 engages the fixed mechanical stop 26 thereby stopping the carrier 12 and stalling the motor 18. At such time, the motor counter-EMF abruptly falls substantially to zero and the transistors 234 and 236 of left and right stall sensing circuits 230 and 232 become nonconductive whenever the motors 18 are de-energized. At such time, lines 130 and 132 fall to a logic zero voltage potential, inhibiting further motor energization through AND gates 124 and 126. The left and right stall sensing circuits 230 and 232 operate independently of one another so that each of the headlamp driving motors 18 is stopped at the appropriate time. Although timer 101 continues to produce output pulses, such pulses are ineffective to energize headlamp motors 18. Counter 184 produces an output pulse on line 190 approximately 4 seconds following the shifting of the headlamp switch 40 to the ON position and such output pulse operates to shut down the drive by setting the latch circuit 222 of input and reset circuit 96. As a result, the outputs of AND gate 220 and OR gate 218 rise to a logic 1 voltage potential resetting counter 184 and disabling start circuit 94 and timer 101. It will be noted that the timed shutdown thereby provided operates independent of the stall sensing circuits 230 and 232 and thereby serves to interrupt motor energization in the event that the motor 18 becomes disconnected from headlamp carrier 12. Such condition remains in effect until the headlamp switch 40 is shifted to the opposite position to lower the vehicle headlamps.

When the operator of the motor vehicle shifts the headlamp switch 40 from the ON position to the OFF position to de-energize the headlamps 24, the control unit input terminal 64 is connected to the positive terminal of battery 60 and the control unit input terminal 62 is opencircuited to de-energize headlamps 24. Also, at such time, electrical coil 172 of motor reversing relay 124 is de-energized and the relay contact arms 164–170 return to the position depicted in FIG. 2 so that further energization of the motors 18 produces counterclockwise motor rotation to lower the headlamp carriers 12. With the exception of the motor reversing relay operation mentioned above, the operation of the control unit 66 in lowering the headlamp carriers 12 is identical to the operation described above in reference to the raising of headlamp carriers 12. Thus, exclusive OR gate 214 momentarily resets counter 184, and after a time delay sufficient to allow the relay contact arms 164–170 of motor reversing relay 124 to assume their new position, counter 184 provides start and stop pulses to start circuit 94 for producing motor rotation. The 170 millisecond operating duration of starting circuit 94 is sufficient to produce motor counter-EMF for biasing transistors 234 and 236 of left and right stall sensing circuits 230 and 232 to their conductive states, and further motor energization is controlled in accordance with the output pulses of timer 101 on line 128. If the motor speed thereafter exceeds the speed reference set by speed sensing circuit 100, transistor 266 is biased to its conductive state to interrupt generation of further output pulses from timer 101. When the headlamp is completely concealed, the motor linkage 20 engages the fixed mechanical stop 30 and the motor 18 stalls. At such time, the motor counter-EMF drops substantially to zero and transistors 234 and 236 become nonconductive thereby inhibiting further motor energization through AND gates 124 and 126. Shortly, thereafter, counter 184 produces an output pulse on line 190 to set the latch 222 of reset and latch circuit 96 for obtaining a reset of counter 184 and a disable of start circuit 94 and oscillator circuit 90.

In the manner described above, the control unit of this invention serves to reliably control the raising and lowering of the headlamp carrier 12 and to sense the engagement thereof with the mechanical stops 26, 30 without the use of position or torque limit switches. To reduce manufacturing costs and power consumption, much of the control unit circuitry depicted in FIG. 2 may be mechanized with a single custom integrated circuit. Although this invention has been described with reference to a system having a movable headlamp, it will be understood that it is equally applicable to a system having a fixed headlamp and a movable headlamp cover. These and other modifications will occur to those skilled in the art, and systems incorporating such modifications may fall within the scope of this invention which is defined by the appended claims.

The embodiments of the invention in which an exclusive property or privilege is claimed are defined as follows:

1. In a motor vehicle lighting system including a headlamp, an operator manipulated headlamp switch, movable concealment means, a source of direct voltage, and an electric motor connected to said concealment means and adapted to be energized with said source for moving the concealment means into engagement with a mechanical stop to fully expose the headlamp, the improvement comprising:

oscillator means for generating a series of pulses in response to operator manipulation of headlamp switch;

run means operative to energize said motor with said source in accordance with the pulses generated by said oscillator means for moving the concealment means toward the mechanical stop;

voltage responsive means for sensing a motor counter-EMF related voltage as an indication of motor rotation and for generating a stall signal when the motor counter-EMF falls substantially to zero indicating that the motor speed has fallen substantially to zero, whereby engagement of the concealment means with the stop is sensed without the use of a limit switch to sense such engagement;

stop means for inhibiting further operation of said run means in response to the generation of a stall signal by said voltage responsive means thereby to interrupt motor energization after the motor moves the concealment means into engagement with said mechanical stop; and start means initiated in response to operator manipulation of said headlamp switch for energizing said motor independent of said run means for a period of time sufficient in duration to produce motor rotation for increasing the motor counter-EMF substantially above zero, whereafter motor energization is controlled by said run means, said voltage responsive means and said stop means.

2. A motor vehicle lighting system according to claim 1 including:

means for inhibiting operation of said run means a predefined period of time after the operator manipulation of the headlamp switch, thereby to prevent continued motor energization in the event that the motor becomes disconnected from the concealment means.

3. In a motor vehicle lighting system including movable concealment means for a headlamp, a source of direct voltage, an electric motor adapted to be energized with said source for moving the concealment means into engagement with first or second mechanical stops to fully expose or conceal the headlamp, and a headlamp switch operator manipulatable to an ON position to energize the headlamp or an OFF position to de-energize the headlamp, the improvement comprising:

oscillator means for generating a series of pulses in response to operator manipulation of the headlamp switch;

run means operative to energize said motor with said source in accordance with the pulses generated by said oscillator means for moving the concealment means toward the first mechanical stop to expose the headlamp if the headlamp switch is in the ON position and toward the second mechanical stop if the headlamp switch is in the OFF position;

voltage responsive means for sensing a motor counter-EMF related voltage as an indication of motor rotation and for generating a stall signal when the motor counter-EMF falls substantially to zero indicating that the motor's speed has fallen substantially to zero, whereby engagement of the concealment means with the stops is sensed without the use of a limit switch to sense such an engagement;

stop means for inhibiting further operation of said run means in response to generation of a stall signal by said voltage responsive means thereby to interrupt motor energization after the motor moves the concealment means into engagement with said stops;

start means initiated in response to operator manipulation of the headlamp switch for energizing the motor independent of said run means for a period of time sufficient in duration to produce motor rotation for increasing the motor counter-EMF substantially above zero whereafter motor energization is controlled by said run means, said voltage responsive means and said stop means; and means for interrupting energization of said motor to prevent further movement of said concealment means if the motor is energized for moving the concealment means toward the second mechanical stop to conceal the headlamp while the headlamp switch is in the ON position.

4. In a motor vehicle lighting system including an operator manipulated headlamp switch, a movable carrier for a headlamp, a source of direct voltage and an electric motor connected to said carrier and adapted to be energized with said source for moving the carrier into engagement with a mechanical stop to fully expose the headlamp, a method of operation comprising the steps of:

energizing the motor for a predetermined period of time to move the carrier toward the mechanical stop in response to operator manipulation of the headlamp switch, such predetermined period of time being sufficient in duration to produce motor rotation that increases the motor counter EMF substantially above zero; and thereafter continuing the motor energization in a series of pulses for producing further movement of the headlamp carrier;

sensing a motor counter-EMF related voltage as an indication of motor rotation and generating a stall signal when the motor EMF falls substantially to zero indicating that the motor speed has fallen substantially to zero whereby engagement of the carrier with the stop is sensed without the use of a limit switch to sense such engagement; and interrupting energization of the motor in response to the generation of a stall signal thereby to prevent further energization of the motor after the carrier has been moved into engagement with the mechanical stop.

5. A method of operation as set forth in claim 4 including the step of:

de-energizing the motor a predefined period of time following the operator manipulation of the headlamp switch thereby to prevent continued motor energization in the event that the motor becomes disconnected from the headlamp carrier.

6. In a motor vehicle lighting system including a movable carrier for a headlamp, a source of direct voltage, an electric motor adapted to be energized with said source for moving the carrier into engagement with first or second mechanical stops to fully expose or conceal the headlamp, and a headlamp switch operator manipulatable to an ON position to energize the headlamp or an OFF position to de-energize the headlamp, a method of operation comprising the steps of:

energizing the motor for a predetermined period of time in response to operator manipulation of the headlamp switch so as to move the headlamp carrier toward the first mechanical stop to expose the headlamp if the headlamp switch is in the ON position and toward the second mechanical stop to conceal the headlamp if the headlamp switch is in the OFF position, the predetermined period of time being sufficient in duration to produce motor rotation that increases the motor counter-EMF substantially above zero; and thereafter continuing the motor energization in a series of pulses for producing further movement of the headlamp carrier;

sensing a motor counter-EMF related voltage as an indication of motor rotation and generating a stall signal when the motor counter-EMF falls substantially to zero indicating that the motor speed has fallen substantially to zero, whereby engagement of the carrier with the stops is sensed without the use of a headlamp switch to sense such engagement;

interrupting energization of the motor in response to the generation of a stall signal thereby to prevent further energization of the motor after the carrier has been moved into engagement with the mechanical stop; and interrupting energization of the motor to prevent further movement of the headlamp carrier if the motor is energized for moving the headlamp carrier toward the second mechanical stop to conceal the headlamp while the headlamp switch is in the ON position.

7. A motor vehicle lighting system comprising in combination:

a headlamp, an operator manipulated headlamp switch, movable concealment means, a source of direct voltage, an electric motor connected to said concealment means and adapted to be energized with said source for moving the concealment means into engagement with a mechanical stop to fully expose the headlamp, and motor control means including oscillator means for generating a series of pulses in response to operator manipulation of headlamp switch, run means operative to energize said motor with said source in accordance with the pulses generated by said oscillator means for moving the concealment means toward the mechanical stop, voltage responsive means for sensing a motor counter-EMF related voltage as an indication of motor rotation and for generating a stall signal when the motor counter-EMF falls substantially to zero indicating that the motor speed has fallen substantially to zero, whereby engagement of the concealment means with the stop is sensed without the use of a limit switch to sense such engagement, stop means for inhibiting further operation of said run means in response to the generation of a stall signal by said voltage responsive means thereby to interrupt motor energization after the motor moves the concealment means into engagement with said mechanical stop, and start means initiated in response to operator manipulation of said headlamp switch for energizing said motor independent of said run means for a period of time sufficient in duration to produce motor rotation for increasing the motor counter-EMF substantially above zero, whereafter motor energization is controlled by said run means, said voltage responsive means and said stop means.

8. A motor vehicle lighting system according to claim 7 wherein said motor control means includes:

means for inhibiting operation of said run means a predefined period of time after the operator manipulation of the headlamp switch, thereby to prevent continued motor energization in the event that the motor becomes disconnected from the concealment means.

9. A motor vehicle lighting system comprising in combination:

movable concealment means for a headlamp, a source of direct voltage, an electric motor adapted to be energized with said source for moving the concealment means into engagement with first or second mechanical stops to fully expose or conceal the headlamp, a headlamp switch operator manipulatable to an ON position to energize the headlamp or an OFF position to de-energize the headlamp, and motor control means including oscillator means for generating a series of pulses in response to operator manipulation of the headlamp switch, run means operative to energize said motor with said source in accordance with the pulses generated by said oscillator means for moving the concealment means toward the first mechanical stop to expose the headlamp if the headlamp switch is in the ON position and toward the second mechanical stop if the headlamp switch is in the OFF position, voltage responsive means for sensing a motor counter-EMF related voltage as an indication of motor rotation and for generating a stall signal when the motor counter-EMF falls substantially to zero indicating that the motor's speed has fallen substantially to zero, whereby engagement of the concealment means with the stops is sensed without the use of a limit switch to sense such an engagement, stop means for inhibiting further operation of said run means in response to generation of a stall signal by said voltage responsive means thereby to interrupt motor energization after the motor moves the concealment means into engagement with said stops, start means initiated in response to operator manipulation of the headlamp switch for energizing the motor independent of said run means for a period of time sufficient in duration to produce motor rotation for increasing the motor counter-EMF substantially above zero whereafter motor energization is controlled by said run means, said voltage responsive means and said stop means, and means for interrupting energization of said motor to prevent further movement of said concealment means if the motor is energized for moving the concealment means toward the second mechanical stop to conceal the headlamp while the headlamp switch is in the ON position.

10. An actuator system comprising in combination: operator manipulated switching means, movable device means, a source of direct voltage, an electric motor connected to said movable device means and adapted to be energized with said source for moving the device means into engagement with a mechanical stop, and motor control means including oscillator means for generating a series of pulses in response to operator manipulation of the switching means, run means operative to energize said motor with said source in accordance with the pulses generated by said oscillator means for moving the device means toward the mechanical stop, voltage responsive means for sensing a motor counter-EMF related voltage as an indication of motor rotation and for generating a stall signal when the motor counter-EMF falls substantially to zero indicating that the motor speed has fallen substantially to zero, whereby engagement of the device means with the stop is sensed without the use of a limit switch to sense such engagement, stop means for inhibiting further operation of said run means in response to the generation of a stall signal by said voltage responsive means thereby to interrupt motor energization after the motor moves the device means into engagement with said mechanical stop, and start means initiated in response to operator manipulation of said switching means for energizing said motor independent of said run means for a period of time sufficient in duration to produce motor rotation for increasing the motor counter-EMF substantially above zero, whereafter motor energization is controlled by said run means, said voltage responsive means and said stop means.

* * * * *